US011863860B2

(12) United States Patent
Mohamed

(10) Patent No.: US 11,863,860 B2
(45) Date of Patent: Jan. 2, 2024

(54) IMAGE CAPTURE EYEWEAR WITH CONTEXT-BASED SENDING

(71) Applicant: Sherif Mohamed, Santa Monica, CA (US)

(72) Inventor: Sherif Mohamed, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 46 days.

(21) Appl. No.: 17/147,872

(22) Filed: Jan. 13, 2021

(65) Prior Publication Data
US 2022/0103745 A1 Mar. 31, 2022

Related U.S. Application Data

(60) Provisional application No. 63/085,296, filed on Sep. 30, 2020.

(51) Int. Cl.
*H04N 23/62* (2023.01)
*G01S 19/01* (2010.01)
(Continued)

(52) U.S. Cl.
CPC ............ *H04N 23/62* (2023.01); *G01S 19/01* (2013.01); *G06F 3/017* (2013.01); *G06V 20/10* (2022.01); *H04N 23/80* (2023.01)

(58) Field of Classification Search
CPC .......... H04N 5/23216; H04N 5/23229; H04N 1/32037; H04N 13/239; H04N 5/2257; H04N 5/232933; H04N 23/57; H04N 23/62; H04N 23/631; H04N 23/80; G06V 20/10; G06V 2201/10; G06V 40/113; G01S 19/01; G06F 3/017; G06F 1/163; G06F 1/1671; G06F 1/1686; G06F 1/1688; G06F 1/169; G06F 3/011; G06F 3/03547; G06F 3/04883; G02B 2027/0138; G02B 2027/0178; G02B 27/017; G02C 11/10; G02C 7/086

See application file for complete search history.

(56) References Cited

U.S. PATENT DOCUMENTS

2003/0004916 A1  1/2003  Lewis
2008/0133526 A1  6/2008  Haitani et al.
(Continued)

OTHER PUBLICATIONS

International Search Report and Written Opinion for International Application No. PCT/US2021/051635, dated Dec. 14, 2021 (Dec. 14, 2021)—16 pages.

*Primary Examiner* — Antoinette T Spinks
(74) *Attorney, Agent, or Firm* — Culhane Meadows PLLC; Stephen J. Weed

(57) ABSTRACT

Systems, methods, and instructions on non-transitory computer readable media for automatically sending images to designated recipients based on context selection criteria (e.g., one or more of location, content, or quality). The system includes a camera and a user interface to trigger the camera to capture an image. The method includes identifying context selection criteria, identifying designated recipients, receiving the image captured by the camera, determining image data for the captured image, comparing the determined image data to the identified context selection criteria to identify a match, and sending the captured image to the set of designated recipients responsive to the identified match.

18 Claims, 15 Drawing Sheets

(51) Int. Cl.
    *G06F 3/01*       (2006.01)
    *G06V 20/10*    (2022.01)
    *H04N 23/80*    (2023.01)

(56) References Cited

U.S. PATENT DOCUMENTS

| | | |
|---|---|---|
| 2012/0191709 A1 | 7/2012 | Morrison et al. |
| 2012/0226663 A1 | 9/2012 | Kline et al. |
| 2014/0253775 A1* | 9/2014 | Kim .................... G06F 3/03547 |
| | | 348/333.01 |
| 2016/0239724 A1 | 8/2016 | Arfvidsson et al. |
| 2017/0257575 A1 | 9/2017 | Kim et al. |
| 2020/0104039 A1 | 4/2020 | Robertson et al. |
| 2020/0127952 A1 | 4/2020 | Yang et al. |

\* cited by examiner

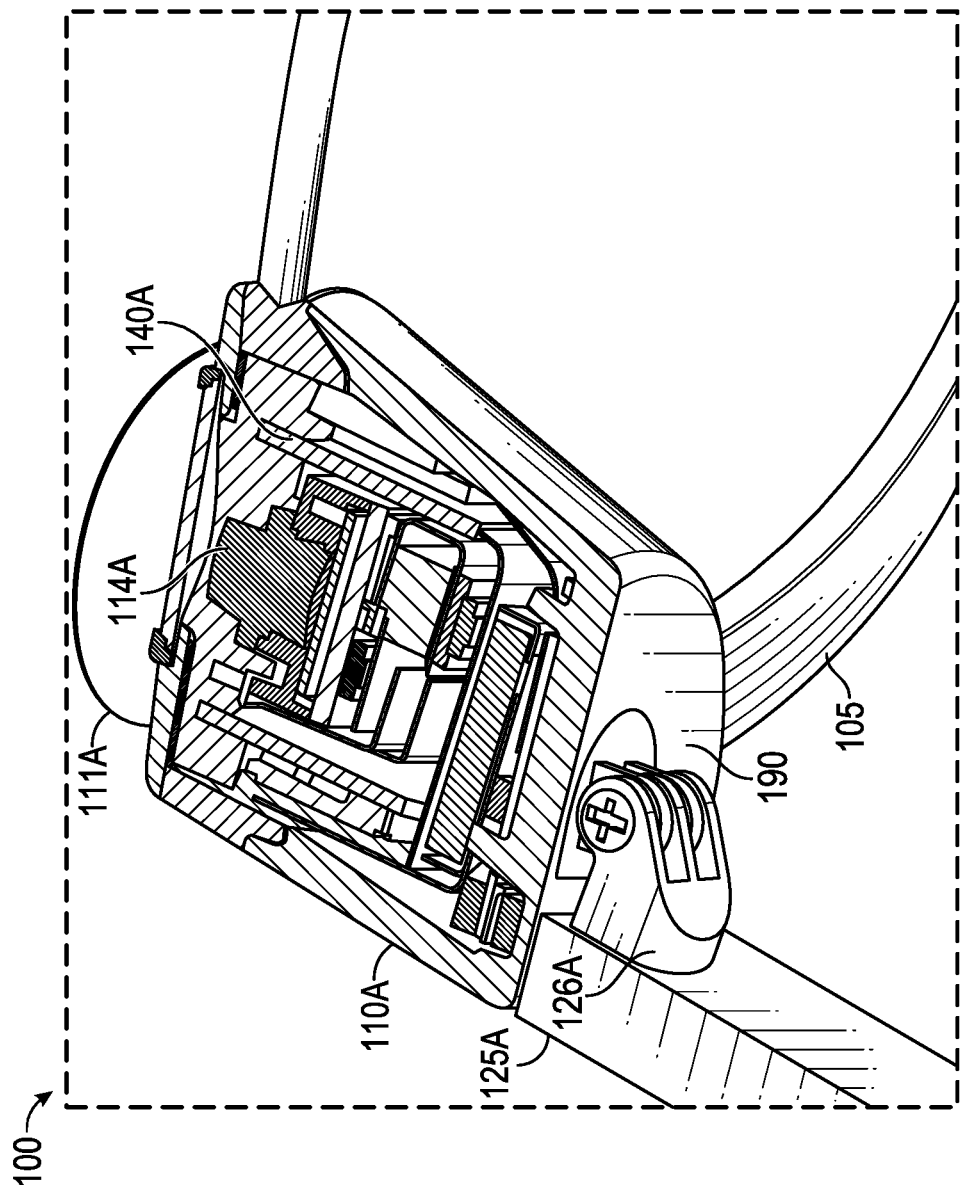

IMAGE CAPTURE EYEWEAR WITH CONTEXT-BASED SENDING

CROSS-REFERENCE TO RELATED APPLICATIONS

This application claims priority to U.S. Provisional Application Ser. No. 63/085,296 entitled IMAGE CAPTURE EYEWEAR WITH CONTEXT-BASED SENDING, filed on Sep. 30, 2020, the contents of which are incorporated fully herein by reference.

TECHNICAL FIELD

The present subject matter relates to image capture eyewear, e.g., smart glasses, and, more particularly, to image capture eyewear systems that automatically send captured images to recipients based on image context selection criteria.

BACKGROUND

Image capture eyewear, such as smart glasses, headwear, and headgear available today integrate lenses, cameras, and wireless network transceiver devices. Users of such eyewear desire added functionality to improve convenience and efficiency.

BRIEF DESCRIPTION OF THE DRAWINGS

The drawing depict implementations, by way of example only, not by way of limitations. In the figures, like reference numerals refer to the same or similar elements. When a plurality of similar elements are present, a single reference numeral may be assigned to the plurality of similar elements with a letter designation referring to specific elements. When referring to the elements collectively or to a non-specific one or more of the elements, the small letter designation may be dropped.

Features of the various examples described will be readily understood from the following detailed description, in which reference is made to the figures. The various elements shown in the figures are not drawn to scale unless otherwise indicated. The dimensions of the various elements may be enlarged or reduced in the interest of clarity. Included in the drawing are the following figures:

FIG. 1D is a perspective, partly sectional view of a left corner of the eyewear device of FIG. 1C depicting the left visible-light camera, and a circuit board;

DETAILED DESCRIPTION

Figure 1A:
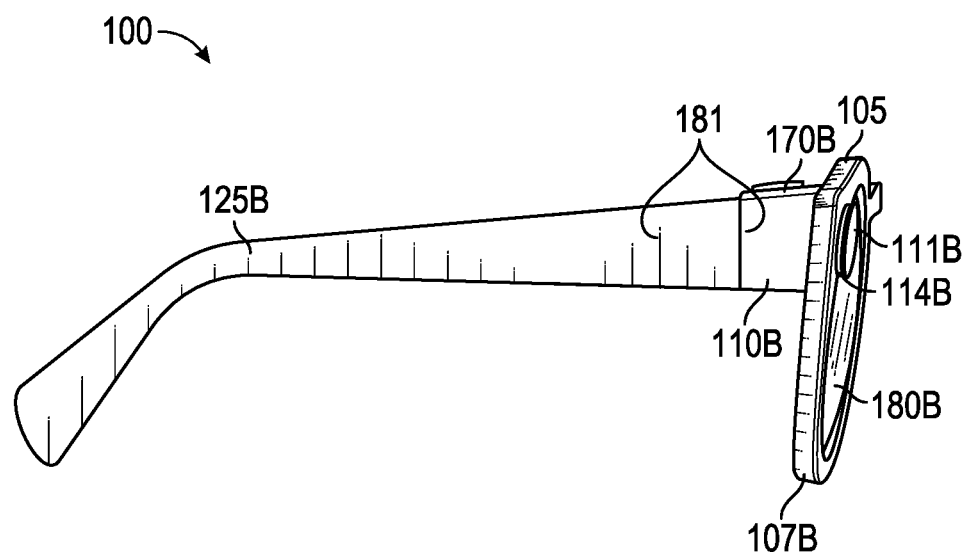
FIG. 1A is a side view (right) of an example hardware configuration of an eyewear device suitable for use in an image capture eyewear with context-based sending system.

Examples described herein relate to automatically sending an image captured with an eyewear device to designated recipients in response to context selection criteria (e.g., one or more of location, content, or quality) matching image data associated with the captured image. The eyewear device includes a camera and a user interface. A captured image is sent by identifying context selection criteria, identifying designated recipients, receiving the image captured by the camera, determining image data for the captured image, comparing the determined image data to the identified context selection criteria to identify a match, and automatically sending the captured image to the set of designated recipients responsive to the identified match.

Although the various systems and methods are described herein with reference to automatically sending images captured with an eyewear device, the technology described may be applied to other mobile device such as a tablet, watch, or cellular telephone.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The orientations of the eyewear device, other mobile devices, associated components, and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and other gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, identified finger gestures on the touchpad 181, initiates image capture by the eyewear device 100, image capture with auto send, and selection or pressing of a graphical user interface element in an image presented on the image display of the optical assembly 180A, 180B. A single tap finger gesture may be set to trigger the capture of an image without sending; and a double-tap finger gesture or tap and hold may be set to trigger the capture and automatic send of an image responsive to previously defined context selection criteria. Although the user interface is illustrated and described as a touch pad, the user interface may comprise other components such as a button in addition to or instead of a touch pad.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
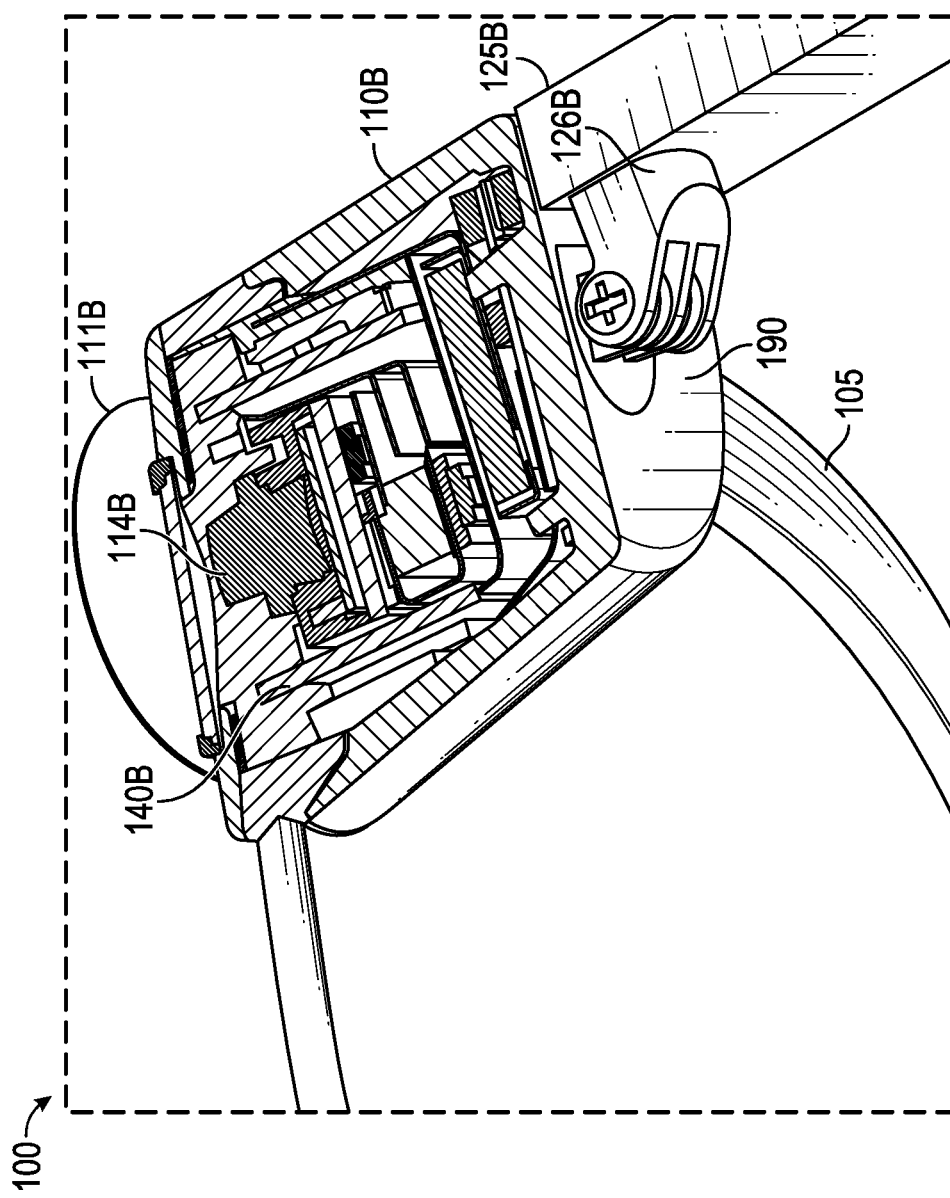
FIG. 1B is a perspective, partly sectional view of a right corner of the eyewear device of FIG. 1A depicting a right visible-light camera, and a circuit board.
Figure 1C:
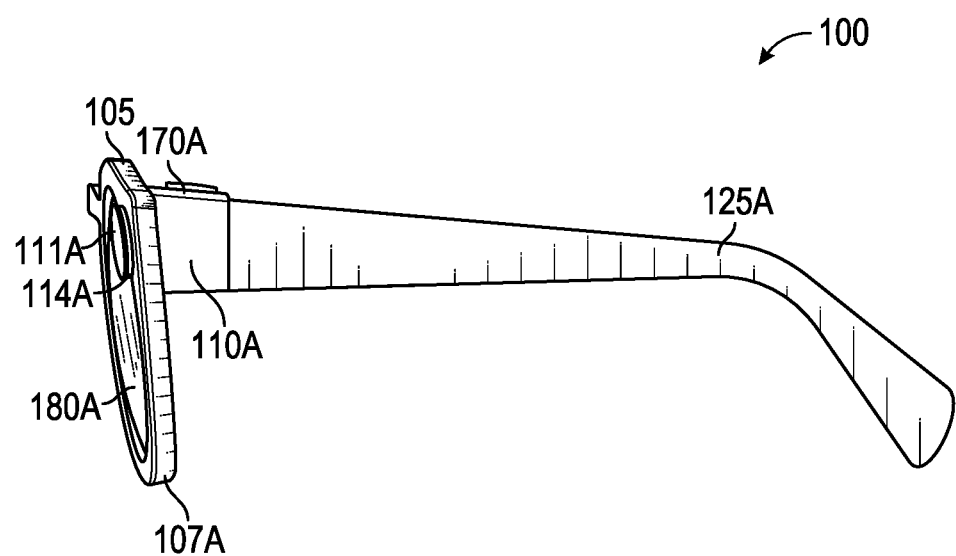
FIG. 1C is a side view (left) of an example hardware configuration of the eyewear device of FIG. 1A, which shows a left visible-light camera.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as a stereo camera, of which the right visible-light camera 114B is located on a right corner 110B. As shown in FIGS. 1C-D, the eyewear device 100 also includes a left visible-light camera 114A.

Figure 3:
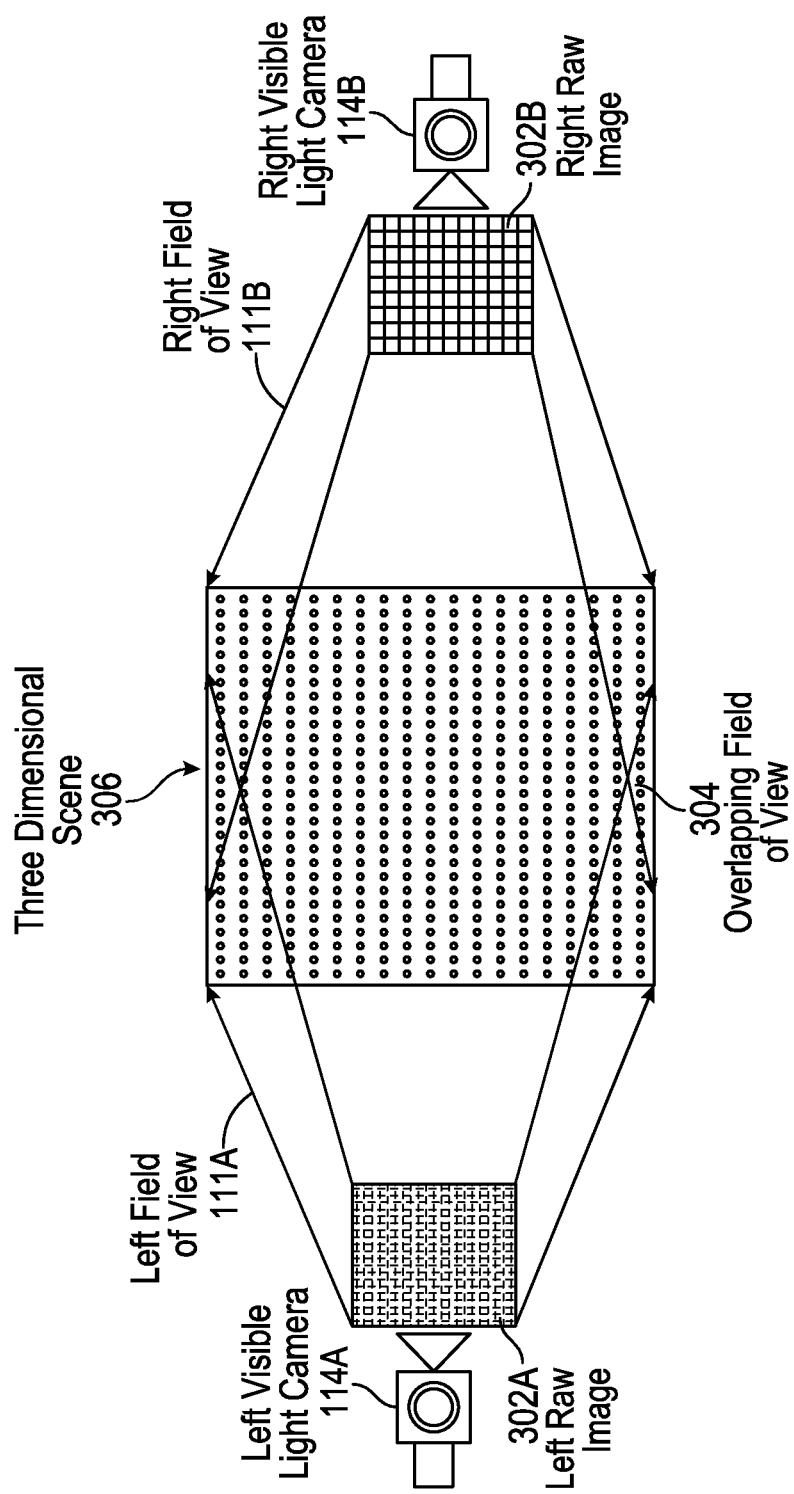
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640$p$ (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126A connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
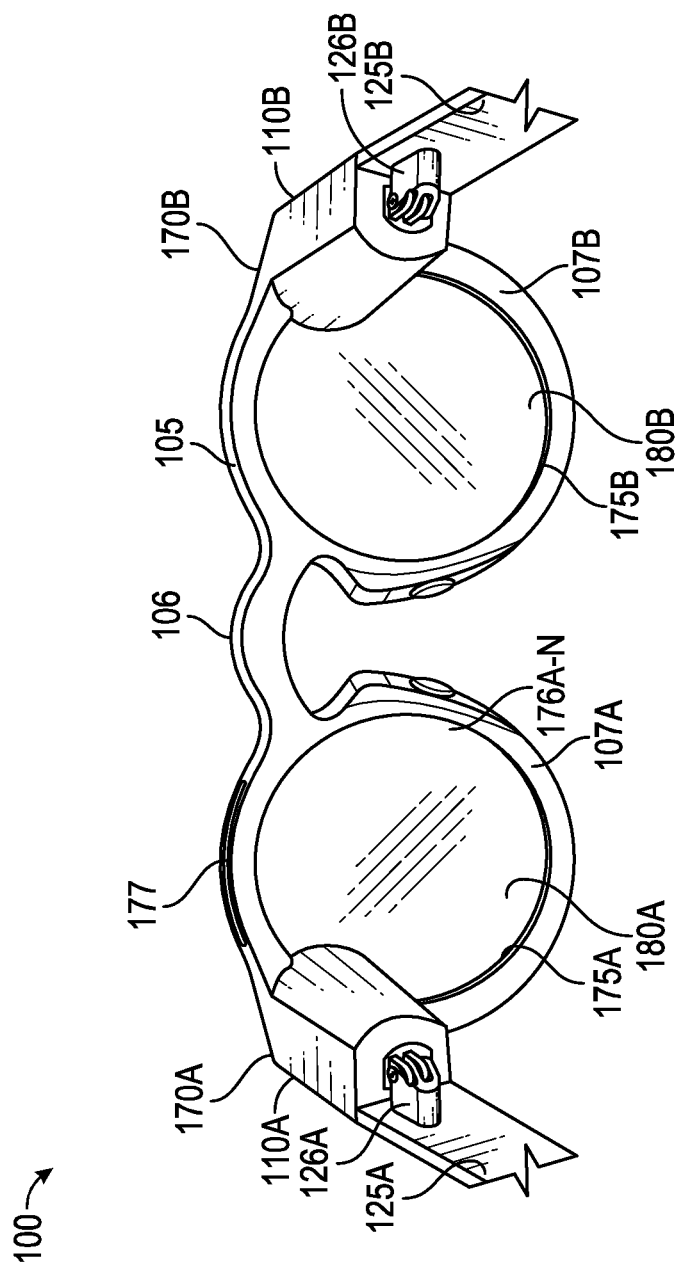
FIGS. 2A and 2B are rear views of example hardware configurations of an eyewear device utilized in the image capture eyewear with context-based sending system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
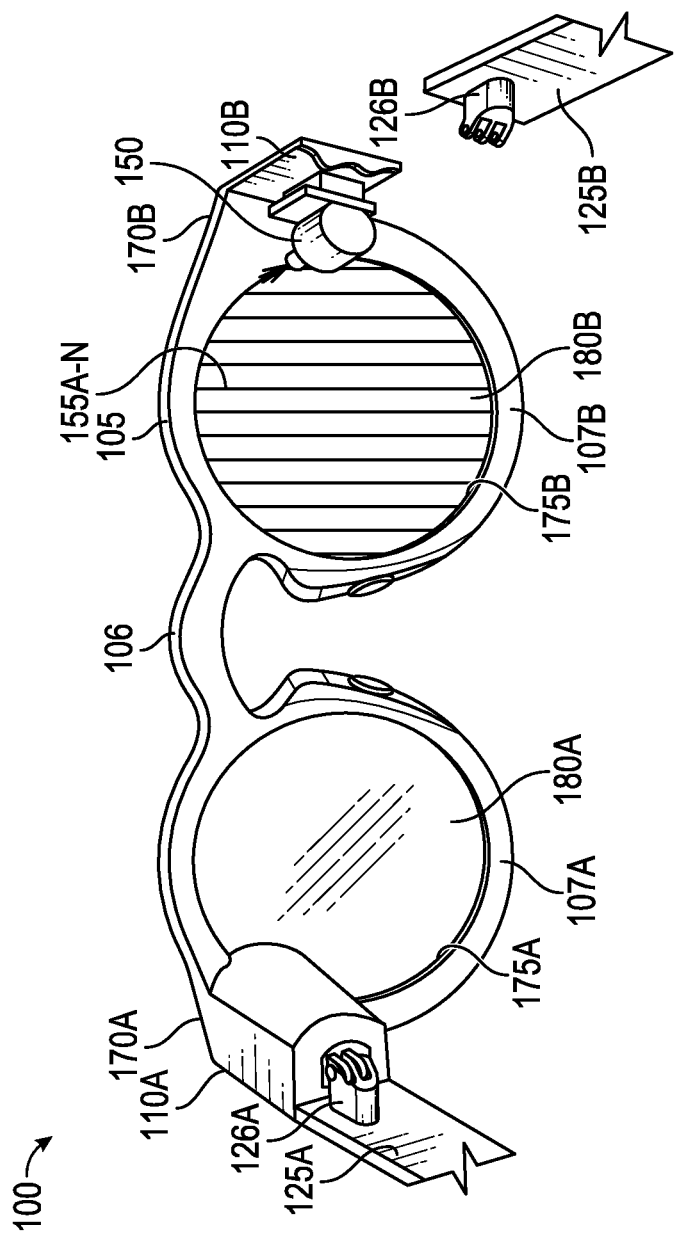

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended use of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double prime, A through N, not shown) which are configured to interact with light from the right projector 150B. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the image capture eyewear with context-based sending system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
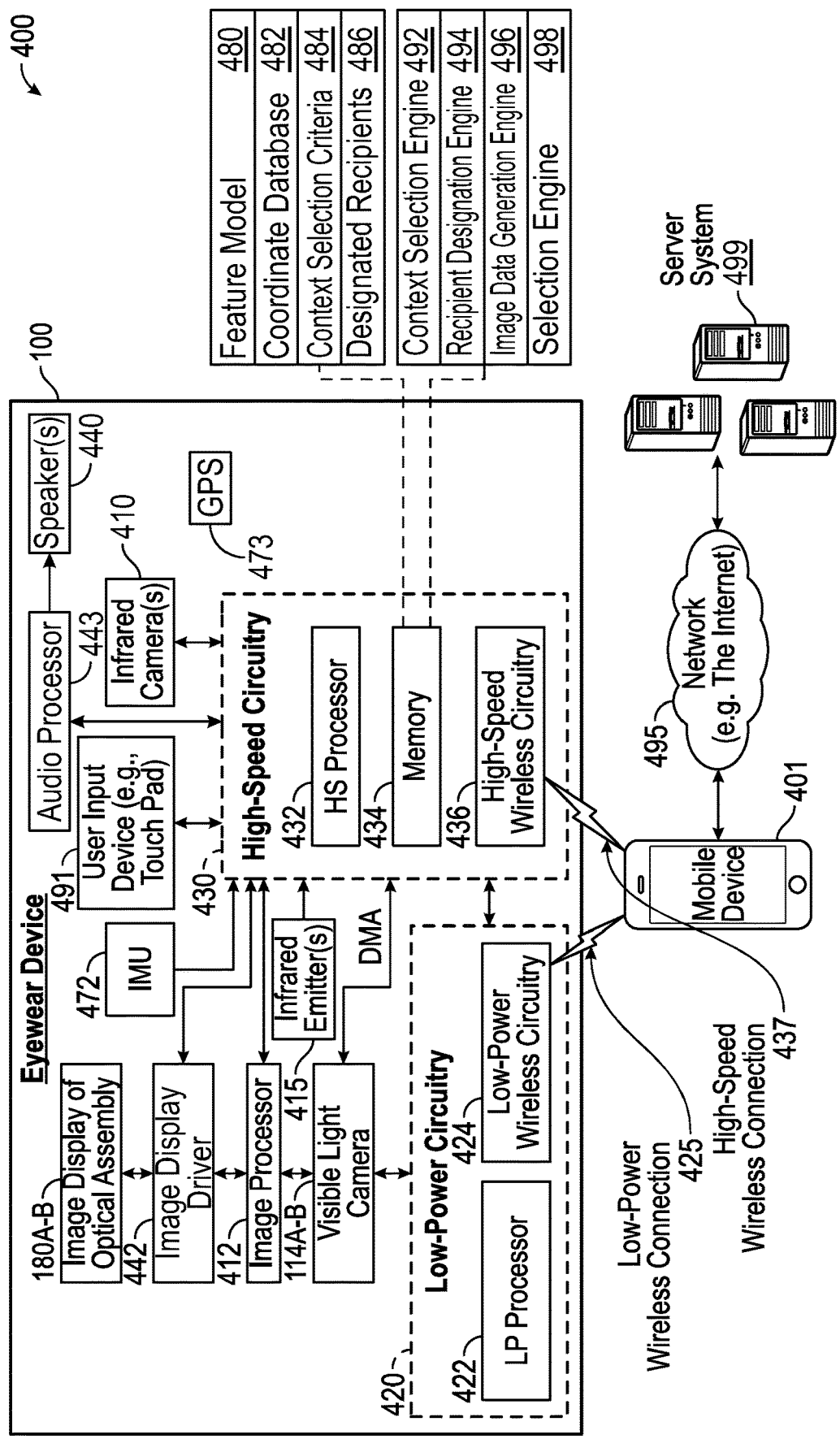
FIG. 4 is a functional block diagram of an example image capture eyewear with context-based sending system including a mobile device (e.g., an eyewear device) and a server system connected via various networks.

FIG. 4 is a functional block diagram of an example image capture eyewear with context-based sending system 400 that includes a wearable device (e.g., an eyewear device 100), a mobile device 401, and a server system 499 connected via various networks 495 such as the Internet. The image capture eyewear with context-based sending system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
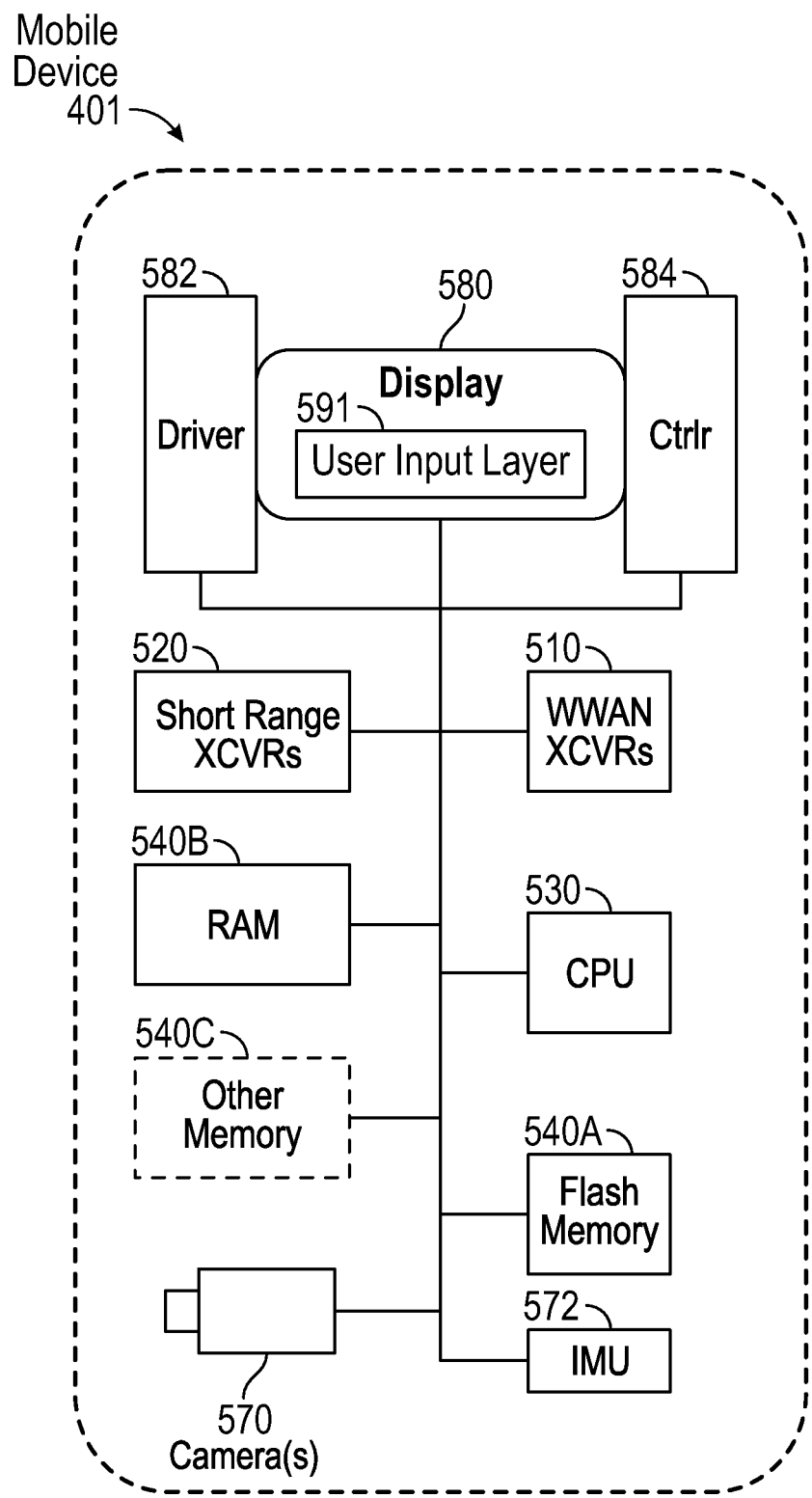
FIG. 5 is a diagrammatic representation of an example hardware configuration for a mobile device of the image capture eyewear with context-based sending system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 499 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 499 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 499 and network 495. The network 495 may include any combination of wired and wireless connections.

The image capture eyewear with context-based sending system 400, as shown in FIG. 4, includes a computing device, such as mobile device 401, coupled to an eyewear device 100 over a network. The image capture eyewear with context-based sending system 400 includes a memory for storing instructions and a processor for executing the instructions. Execution of the instructions of the image capture eyewear with context-based sending system 400 by the processor 432 may configure the eyewear device 100 to cooperate with the mobile device 401. The image capture eyewear with context-based sending system 400 may utilize the memory 434 of the eyewear device 100 or the memory elements 540A, 540B, 540C of the mobile device 401 (FIG. 5). Also, the image capture eyewear with context-based sending system 400 may utilize the processor elements 432, 422 of the eyewear device 100 or the central processing unit (CPU) 530 of the mobile device 401 (FIG. 5). In addition, the image capture eyewear with context-based sending system 400 may further utilize the memory and processor elements of the server system 499. In this aspect, the memory and processing functions of the image capture eyewear with context-based sending system 400 can be shared or distributed across the eyewear device 100, the mobile device 401, and the server system 499.

The memory 434, in some example implementations, includes or is coupled to feature model 480, coordinate database 482, context selection criteria 484, and designated recipients 486. The feature model 480 is a CNN model trained to identify, for example, landmarks and iconic characters (e.g., the Eiffel Tower and Mickey Mouse). The coordinate database 482 includes location coordinates. The location coordinates may include location coordinates of the eyewear device 100 (e.g., to determine when it is in a new area), location coordinates of images captured by the eyewear device 100 at the time of capture, and location coordinates of image from devices of others for use in identifying popular image capture locations. The location coordinates may be stored in one or more databases in memory 434 by and for access by the processor 432. The context selection criteria 484 includes a list of selections made by a user/wearer of the eyewear device 100 to determine when to automatically send an image. The designated recipients 486 includes a set of one or more recipients to which the eyewear device automatically sends the images. In one example, a recipient is a person or group of people having electronic devices for viewing the images. In another example, additionally or alternatively, a recipient is a social media platform of the wearer/user (e.g., a Snapchat Story available through Snap Inc. of Santa Monica, California) hosted on a server system 499. The context selection criteria and designated recipients may be stored in one or more databases in memory 434 by and for access by the processor 432.

The memory 434 additionally includes, for execution by the processor 432, a context selection engine 492, a recipient designation engine 494, an image data generation engine 496, and a selection engine 498. The context selection engine 492 includes instructions for selecting image context on which to base automatic sending. The recipient designation engine 494 includes instructions for designating the recipients of image being automatically sent. The image data generation engine 496 includes instructions for generating image information (e.g., location information and presence of landmarks or iconic characters) for use in comparisons with the image context. The selection engine 498 includes instructions for selecting images to automatically send based on a matching comparison of image data for an image to context selection criteria established by the user of the eyewear device 100.

In one example, the server system 499 receives, via the network 395, images from the eyewear device 100 via the mobile device 401, from the mobile device 401, and from other devices for use by neural network programming to train the feature model 480. The server system 499 sends the trained feature model to the eyewear device 100 or the mobile device 401 for use in identifying landmarks and iconic characters. A suitable neural network is a convolutional neural network (CNN) based on one of the following architectures VGG16, VGG19, ResNet50, Inception V3, and Xception, or other CNN architectures.

In one example, machine learning techniques (e.g., deep learning) are used to identify objects in an image such as particular landmarks or iconic characters (e.g., the Eiffel Tower, Mickey Mouse, etc.) and the presence of people or animals. Deep learning is a subset of machine learning that uses a set of algorithms to model high-level abstractions in data using a deep graph with multiple processing layers including linear and non-linear transformations. While many machine learning systems are seeded with initial features and network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

CNNs are biologically inspired networks of interconnected data used in deep learning for detection, segmentation, and recognition of pertinent objects and regions in datasets. CNNs evaluate raw data in the form of multiple arrays, breaking the data in a series of stages, examining the data for learned features.

In one example, image analysis is carried out using a CNN. The CNN receives an input image and abstracts the image in a convolution layer to identify learned features (e.g., landmark structures and iconic characters). In a second convolution layer, the image is transformed into a plurality of images in which the learned features are each accentuated in a respective sub-image. The images are further processed to focus on the features of interest in the images. The resulting images are then processed through a pooling layer which reduces the size of the images to isolate portions of the images including the features of interest. Outputs of the convolutional neural network receive values from the last non-output layer and classify the image based on the data received from the last non-output layer.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises one or more visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Figure 6A:
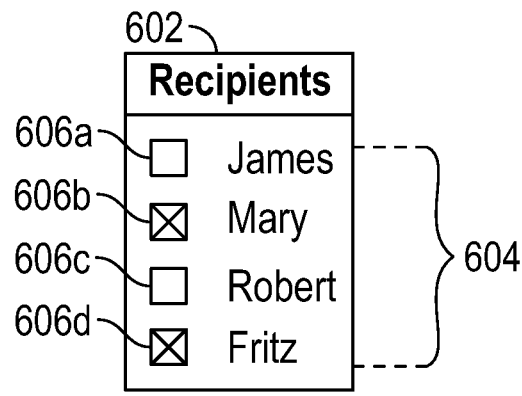
FIGS. 6A and 6B are example graphical user interfaces for designating recipients and context selection criteria, respectively.
Figure 6B:
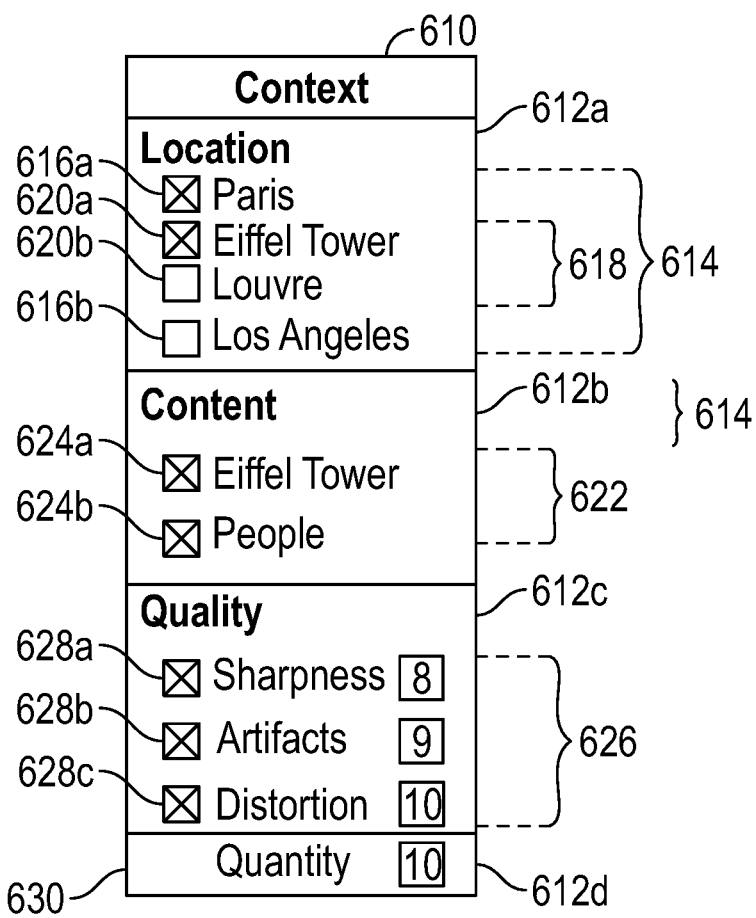

FIGS. 7A-7G are flow charts listing steps in example methods of context-based sending. The steps are described below with reference to an eyewear device 100, GUI 602 for designating recipients (FIG. 6A), and GUI 610 for designating context selection criteria (FIG. 6B). Although the steps are described with reference to the eyewear device 100, as described herein, other implementations of the steps described, for other types of mobile devices, will be understood by one of skill in the art from the description herein. Additionally, it is contemplated that one or more of the steps shown in the drawings, and described herein, may be omitted, repeated, performed simultaneously or in a series, performed in an order other than illustrated and described, or performed in conjunction with additional steps.

The steps are described with reference to an eyewear device 100 that includes a camera 114, a processor 432, and a memory 434. Consistent with aspects of some example implementations, the eyewear device 100 initiates and runs a context search engine 492, a recipient designation engine 494, an image data generation engine 496, and a selection engine 498. In other example implementations, another device such as mobile device 401 or server system 499 perform some or all the functionality of the eyewear device 100 or performs some of the functionality in conjunction with the eyewear device 100.

Figure 7A:
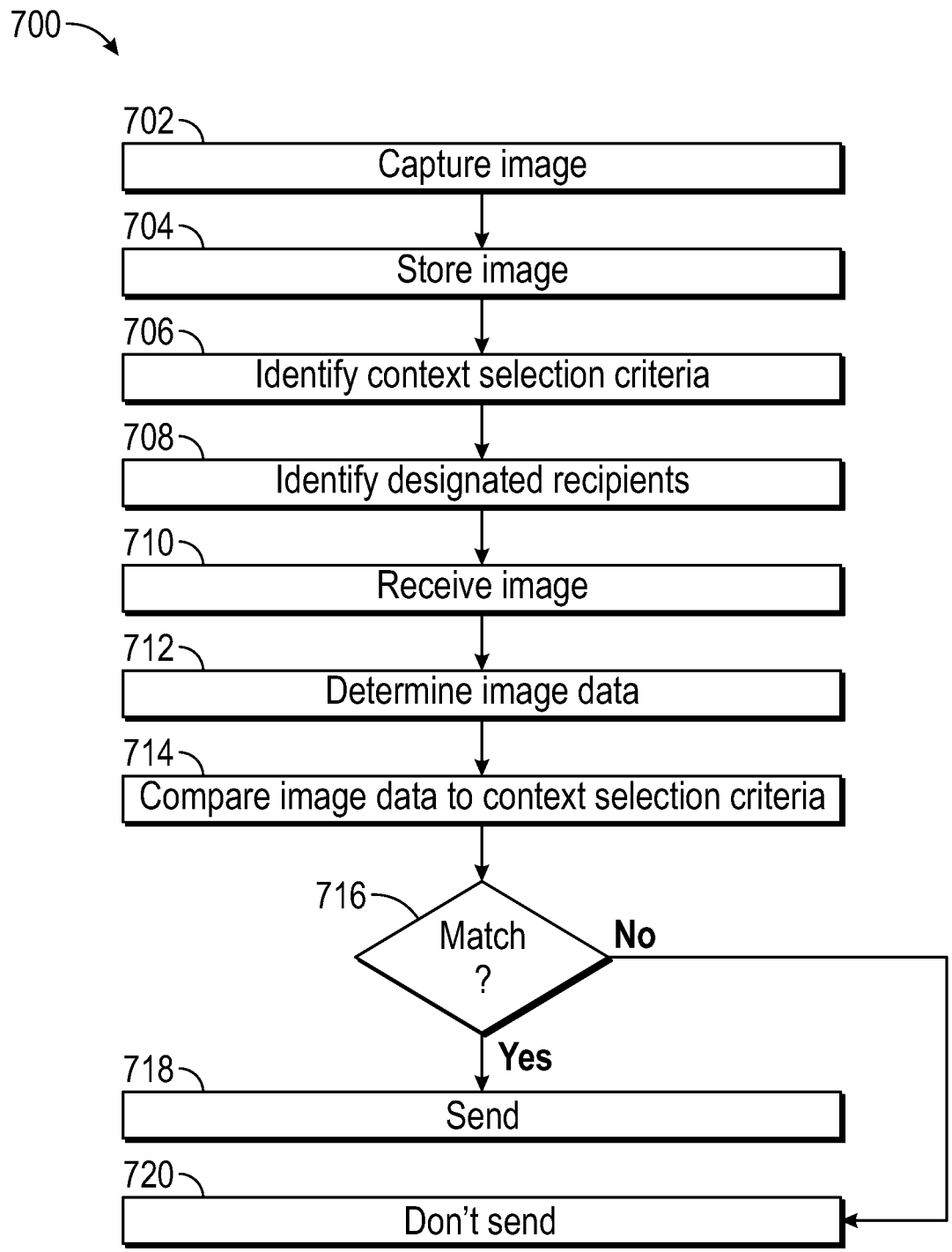
FIGS. 7A, 7B, 7C, 7D, 7E, 7F, and 7G are flow charts listing example steps for implementing an image capture eyewear with context-based sending system.

FIG. 7A depicts a flow chart 700 for implementing an automatic image sending system based on context selection criteria applied to the images. At block 702, the eyewear device 100 captures an image. Processor 432 of eyewear device 100 may capture the image using a visible light camera 114 in response to a gesture on a user input device 491.

At block 704, the eyewear device 100 stores the image. In one example, processor 432 stores the captured image in the memory 434. In another example, processor 432 additionally or alternatively sends the captured image to another device (e.g., mobile device 401) for storage (e.g., by processor 530 in memory 540).

At block 706, the eyewear device 100 identifies context selection criteria using context selection engine 492. In one example, processor 432 presents a graphical user interface on display 180 for use by the wearer in identifying context selection criteria (see GUI 610; FIG. 6B). In another example, processor 530 of a related mobile device 401 presents a graphical user interface on display 590 for use in identifying context selection criteria. The context selection criteria includes one or more of capture location of the image, image content (e.g., landmark or people), image quality, or quantity of image.

At block 708, the eyewear device 100 identifies designated recipients using recipient designation engine 494. In one example, processor 432 presents a graphical user interface on display 180 for use by the wearer in identifying context selection criteria (see GUI 602; FIG. 6A). In another example, processor 530 of a related mobile device 401 presents a graphical user interface on display 590 for use in identifying context selection criteria. The processor may retrieve a list of known contact names, present the list to the wearer/user with checkboxes next to each name, receive checkbox selections, and identify the contact(s) associated with checked boxes as the designated recipients. The processor may additionally or alternatively retrieve a list of the wearer/user's social media platforms, present the list to the wearer/user with checkboxes next to each platform, receive the checkbox selections, and identify the platform(s) associated with checked boxes as the designated recipients. The processor may additionally or alternatively provide the user with an option for selecting all contacts of the wearer/user having a particular identifier or associated status (e.g., a friend or close friend) or such a contact that is within a geolocation associated with the current location of the wearer/user.

At block 710, the eyewear device 100 receives an image. In one example, the processor 432 receives the image from the camera 114, the memory 434, or a related mobile device 401.

At block 712, the eyewear device 100 determines image data using image data generation engine 496. In one example, the processor 432 determines image data. In another example, the processor 530 of a related mobile device 401 determines image data. For location based image data, the processor 432 may retrieve location coordinates from the GPS 473 at the time the image is captured. For content based image data, the processor 432 may apply a feature model 480 (e.g., trained using images of landmarks and people) to the captured image or apply a known image recognition program (e.g., Watson from IBM of Armonk, NY). For image quality, the processor 432 may apply image quality metrics to measure image qualities (e.g., one or more of sharpness, artifacts, distortion using, for example, BRISQUE or NIQE algorithms available from The MathWorks, Inc of Natick, Massachusetts).

At block 714, the eyewear device 100 compare image data to context selection criteria. The processor 432 may compare the image data to context selection criteria by sequentially analyzing each of the identified criteria and comparing to the image data. Additionally, if the processor 432 determines that a maximum number of images has been reached (e.g., based on a counter incremented each time an image is identified to send), the processor may stop performing further comparisons.

At decision Block 716, the eyewear device 100 determines if there is a match between the image data and the context selection criteria using selection engine 498. In one example, the processor 432 compares the image data to context selection criteria and identifies one or more images that are an exact match. In another example, the processor 432 compares the image data to context selection criteria and identifies one or more images that include matching criteria exceeding a predefined threshold level (e.g., 90 percent match). For context selection criteria selections depicted in GUI 610, a matching image would be located near the Eiffel Tower in Paris (e.g., within 300 feet of the Eiffel Tower), would include the Eiffel Tower and people, would have a high level of sharpness and low level of artifacts and be free from distortion, and would be one of the first 10 images matching all criteria.

At block 718, reached if there is a match, the eyewear device 100 automatically sends the image to the designated recipients. The processor 432 may send the image via wireless circuitry 424/436 over network 495 directly or indirectly via mobile device 401. At block 720, reached if there is not a match, the eyewear device 100 does not automatically send the image to the designated recipients.

Figure 7B:
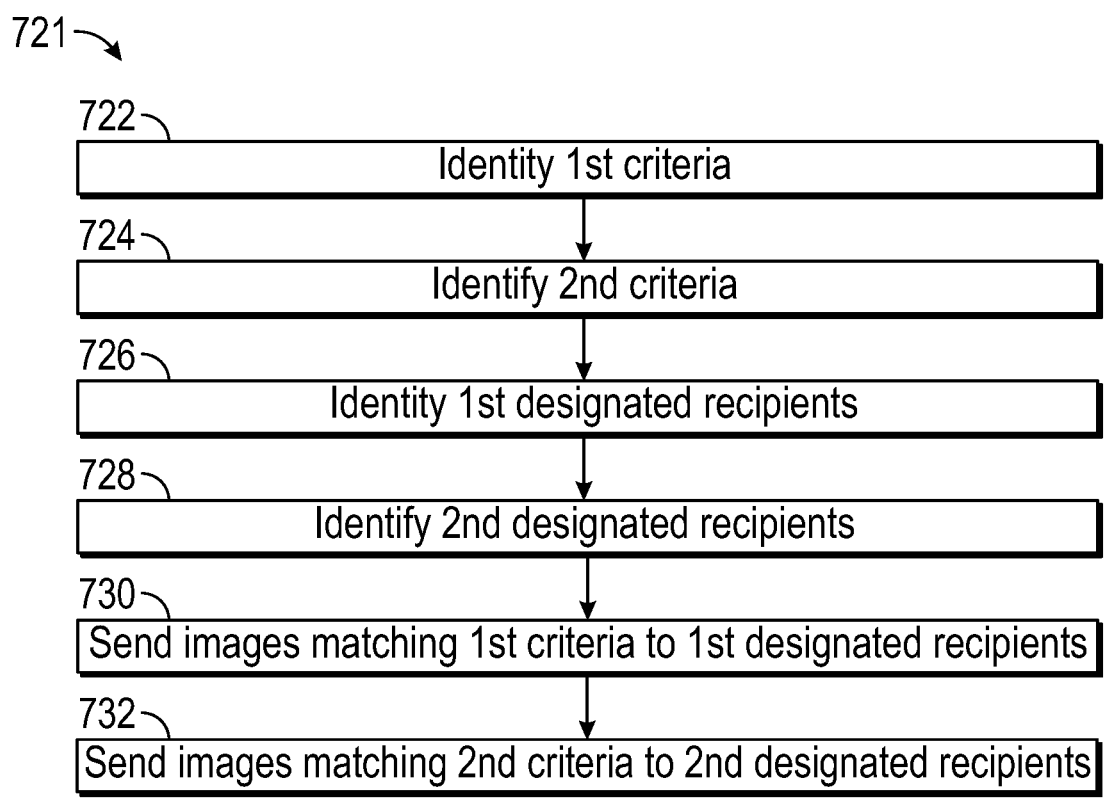

FIG. 7B depicts a flow chart 721 of example steps when there are multiple sets of designated recipients with different selection criteria in accordance with an example implementation of recipient designation engine 494. At block 722, the eyewear device 100 identifies $1^{st}$ criteria. The processor 432 may identify $1^{st}$ selection criteria as described above with reference to block 706. At block 722, the eyewear device 100 identifies $2^{nd}$ criteria. The processor 432 may identify $2^{nd}$ selection criteria as described above with reference to block 706.

At block 726, the eyewear device 100 identifies $1^{st}$ designated recipients for the $1^{st}$ selection criteria. The processor 432 may identify the $1^{st}$ designated recipients as described above with reference to block 708. At block 728, the eyewear device 100 identifies $2^{nd}$ designated recipients for the $2^{nd}$ selection criteria. The processor 432 may identify the $2^{nd}$ designated recipients as described above with reference to block 708.

At block 730, the eyewear device 100 sends the image to the $1^{st}$ designated recipients for image content that matches the $1^{st}$ selection criteria. The processor 432 may send the image to the $1^{st}$ designated recipients as described above with reference to block 718. At block 732, the eyewear device 100 sends the image to the $2^{nd}$ designated recipients for image content that matches the $2^{nd}$ selection criteria. The processor 432 may send the image to the $2^{nd}$ designated recipients as described above with reference to block 718.

Figure 7C:
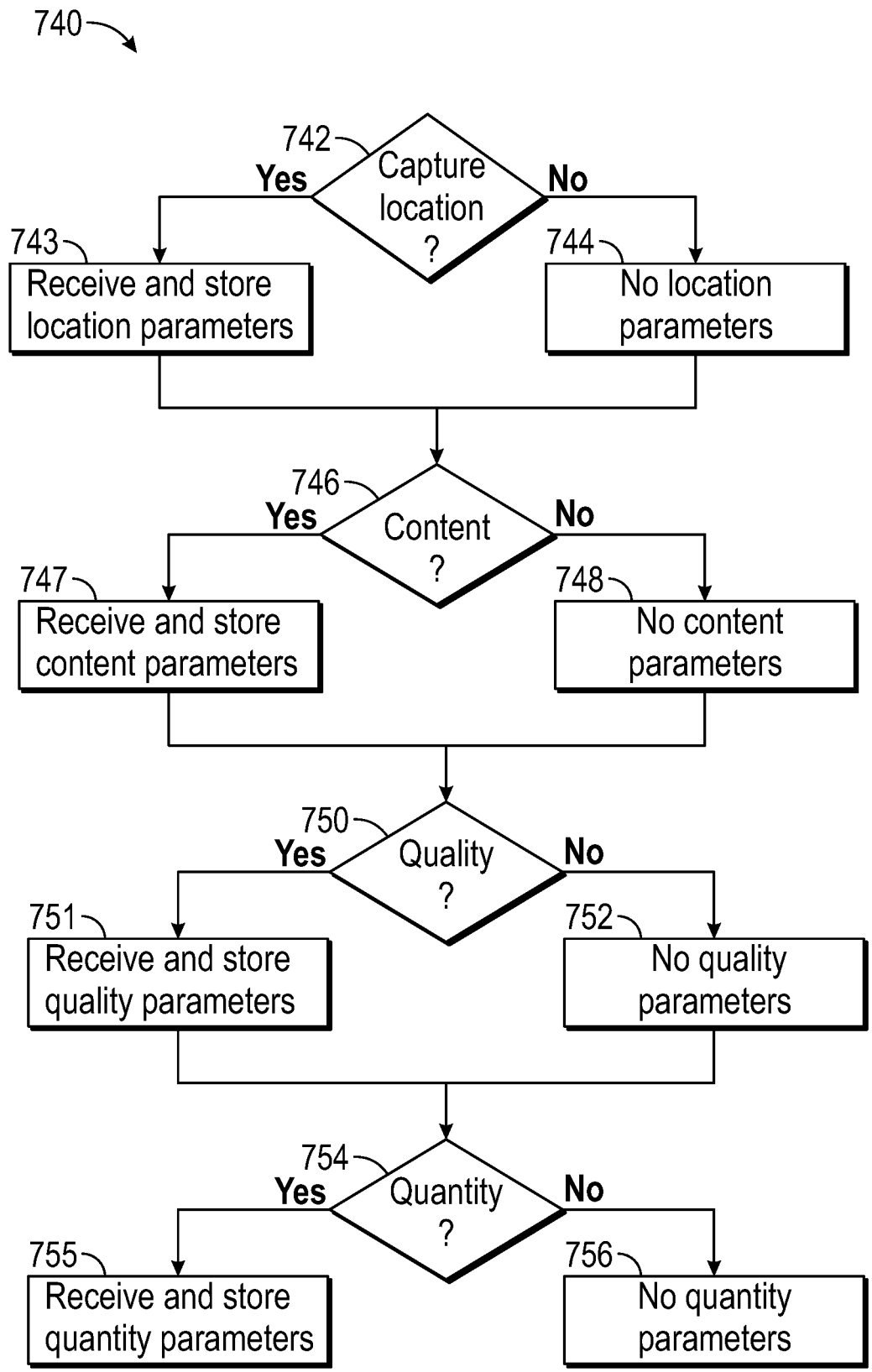

FIG. 7C depicts a flow chart 740 of example steps for identifying context selection criteria in accordance with an example implementation of context selection engine 492. At decision block 742, the eyewear device 100 determines whether the context selection criteria includes specified capture location (e.g., using GUI 610, which includes location selection 612a, content selections 612b, quality selections 612c, and quantity selections 612d). The processor 432 may present the wearer with the GUI 610 on display 180 via image display driver 442 that includes locations 614 and corresponding check boxes 616 (e.g., Paris 616a and Los Angeles 616b). The processor 432 may populate text for the check boxes with locations 614 that are within a predefined radius of the eyewear device 100 (e.g., within 25 miles) or a destination (e.g., determined by processing a wearer's calendar).

At block 743, which is reached if the wearer wants to include capture location as one of the context selection criteria, the eyewear device 100 receives and stores location parameters. The wearer may indicate that they want to include capture location parameters by checking one or more boxes (e.g., Paris 616a) within GUI 610. In an example, selection of a particular location such as Paris results in more specific location information 618 for selection (e.g., Eiffel Tower 620a and the Louvre 620b) to further refine the capture location. In the illustrated GUI 610, the location selection criteria is the Eiffel Tower within Paris. Processing proceeds at block 744 if there are no selections.

At decision block 746, the eyewear device 100 determines whether the context selection criteria includes specified content (e.g., using GUI 610). The processor 432 may present the wearer with the GUI 610 on display 180 via image display driver 442 that includes content 622 and corresponding check boxes 624 (e.g., Eiffel Tower 624a and people 624b). The processor 432 may populate text for the check boxes with content 622 associated with the selected location such as local landmarks that are within a predefined radius of the specified location (e.g., the Eiffel Tower 624a in Paris 616a near the Eiffel Tower 620a) and generic information that is not specific to a location such as the image must include people 624.

At block 747, which is reached if the wearer wants to include content as one of the context selection criteria, the eyewear device 100 receives and stores content parameters. The wearer may indicate that they want to include content parameters by checking one or more boxes (e.g., Eiffel Tower 624a and people 624b) within GUI 610. In the illustrated GUI 610, the content selection criteria is the Eiffel Tower 624a and people 624b. Processing proceeds at block 748 if there are no selections.

At decision block 750, the eyewear device 100 determines whether the context selection criteria includes specified quality (e.g., using GUI 610). The processor 432 may present the wearer with the GUI 610 on display 180 via image display driver 442 that includes image qualities 626 (e.g., sharpness 628a, artifacts 628b, and distortion 628c) and corresponding entry boxes (e.g., drop down number selection; for example, ranging from 1-10 with 1 equal to low priority and 10 equal to high priority). The image qualities may be predefined.

At block 751, which is reached if the wearer wants to include image quality as one of the context selection criteria, the eyewear device 100 receives and stores quality parameters. The wearer may indicate that they want to include quality parameters by adjusting a quality parameter (e.g., setting sharpness 628*a* as an "8" for a high level of sharpness required; setting artifact 628*b* as a "9" for a very high level artifact detection requirement; and setting distortion as a "10" for removing all images with any detected distortion). Processing proceeds at block 752 if there are no settings.

At decision block 754, the eyewear device 100 determines whether the context selection criteria includes a specified quantity (e.g., using GUI 610). The processor 432 may present the wearer with the GUI 610 on display 180 via image display driver 442 that includes a quantity selection 630 and corresponding and corresponding entry box for specify the maximum number of images to send during a trip.

At block 755, which is reached if the wearer wants to include quantity as one of the context selection criteria, the eyewear device 100 receives and stores a quantity parameter. The wearer may indicate that they want to include a quantity parameter by entering a value (e.g., 10 images) within GUI 610. Processing proceeds at block 756 if there is no setting.

Figure 7D:
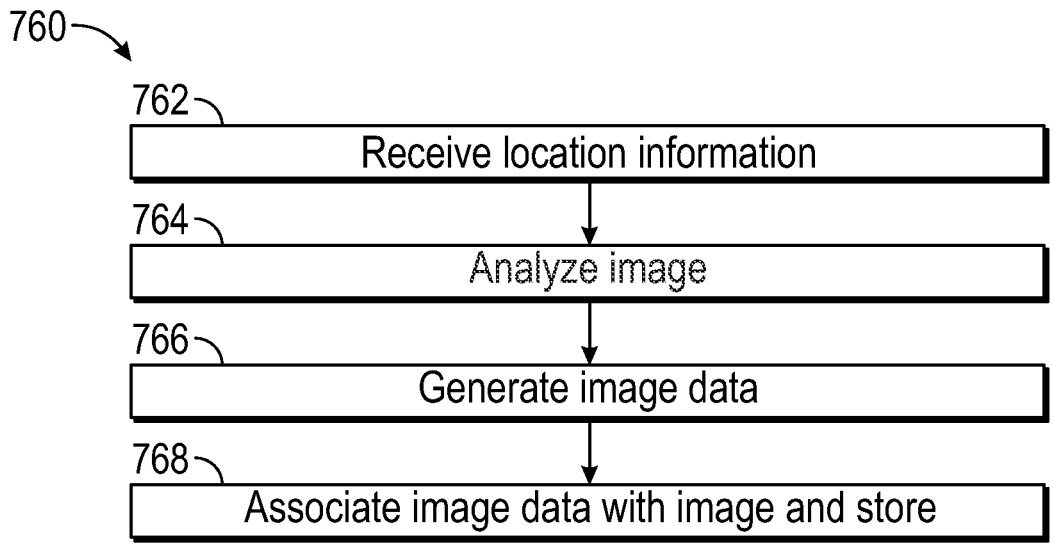

FIG. 7D depicts a flow chart 760 of example steps for generating image data in accordance with an example implementation of image data generation engine 496. At block 762, the eyewear device 100 receives location information for a captured image. In an example, the processor 432 receives location information from GPS 473 at the time the image is captured. The processor 432 may periodically query GPS 473 for location coordinates or request when an image is captured.

At block 764, the eyewear device 100 analyzes image. In an example the processor 432 analyzes an image by applying a feature model 480 that is trained using images of known landmarks and iconic figures. The feature model 480 may additionally be trained to detect the presence of people in the images.

At block 766, the eyewear device 100 generates image data. In an example the processor 432 generates image data responsive to matches identified during image analysis. The image data may include a string of characters associated with identified landmarks and iconic figures (and the presence of people) in the image.

At block 768, the eyewear device 100 associates image data with the image and stores the image data. In an example the processor 432 adds the image data to metadata stored with the captured image.

Figure 7E:
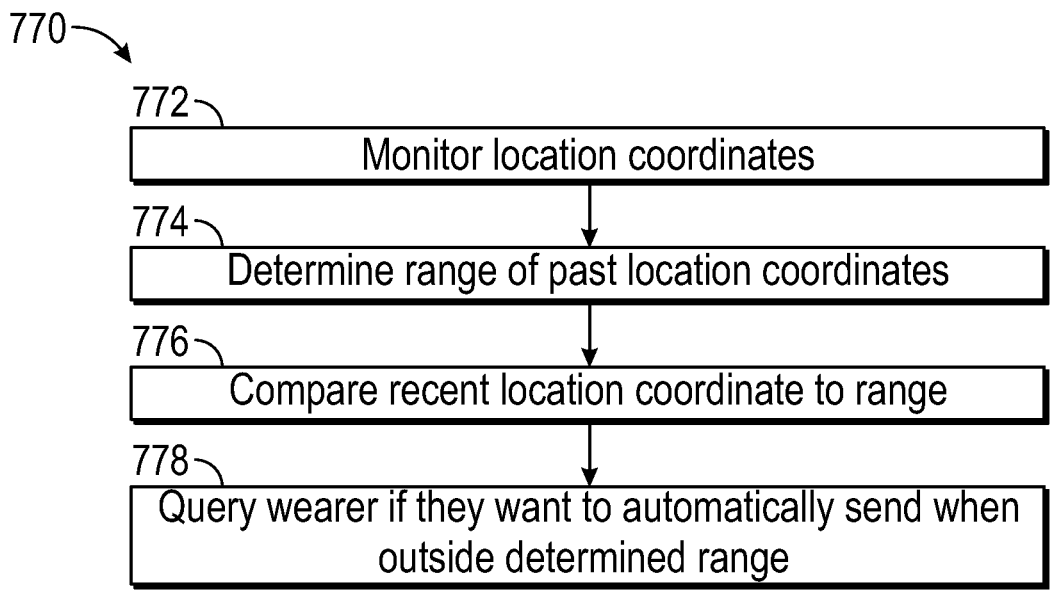

FIG. 7E depicts a flow chart 770 of example steps for determining whether to set up automatic sending. At block 772, the eyewear device 100 monitors location coordinates of the eyewear device 100. The processor 432 may monitor location coordinates by periodically querying GPS 473 for location coordinates.

At block 774, the eyewear device 100 determines a range of past location coordinates. The processor 432 may determine a range of past locations (e.g., a range including all locations within 25 miles of one another).

At block 776, the eyewear device 100 compares recent location coordinate to a range of past location coordinates. The processor 432 may determine one or more ranges of past locations (e.g., a range or ranges including all locations within 25 miles of one another).

At block 778, the eyewear device 100 queries the wearer if they want to automatically send when outside determined range. The processor 432 may compare the determined one or more ranges of past locations to the current location and query the wearer if the current location is outside the determined range(s). The processor 432 may, for example, display the query on the display 180 when the current location is not within the one or more ranges (or a predefined distance, e.g., 10 miles of a range).

Figure 7F:
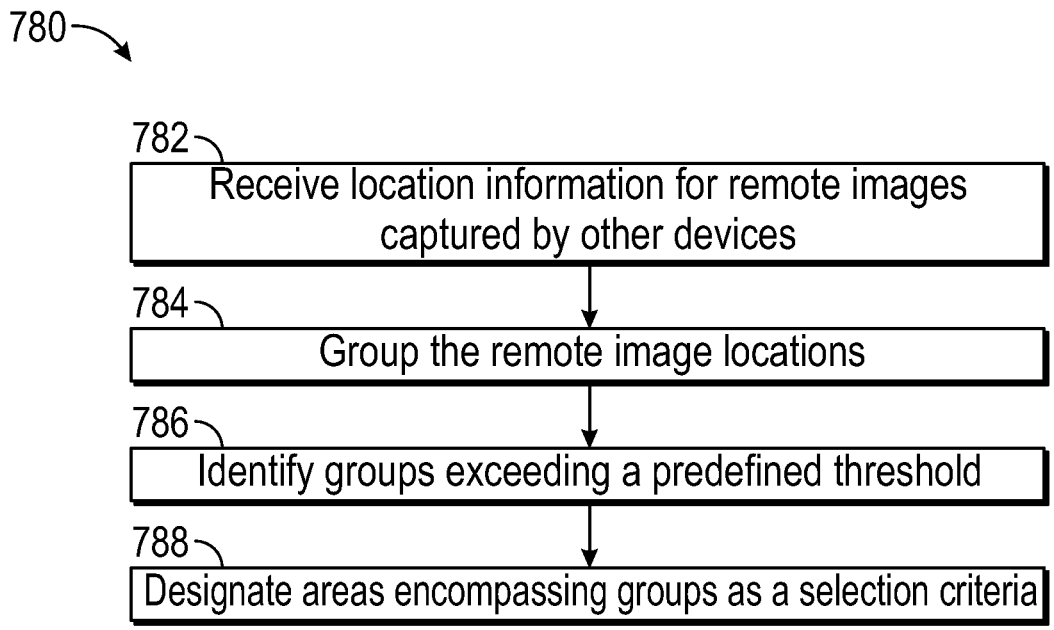

FIG. 7F depicts a flow chart 780 of example steps for designating selection criteria based on images taken by others (e.g., popular images). At block 782, the eyewear device 100 receives location information for remote images captured by other devices. In an example, server system 499 monitors and stores images and corresponding image location coordinates provided by other devices.

At block 784, the eyewear device 100 groups the remote image locations. In an example, the processor 432 receives the remote image locations from the server system 499 and groups them into groups of adjacent location coordinates. In another example, the server system 598 groups the image location coordinates.

At block 786, the eyewear device 100 identifies groups exceeding a predefined threshold. In an example, the processor 432 identifies the groups having a number of images that exceed a threshold value (e.g., 100 images) and identifies those groups as popular image capture areas. In another example, the server system 598 identifies the groups.

At block 788, the eyewear device 100 designates areas encompassing groups exceed the threshold as a selection criteria. In an example, the processor 432 designates the areas as a selection criteria (e.g., for display in the location section 612*a* of the GUI 610 (FIG. 6B). In another example, where the server system 598 identifies the group, the processor 432 first receives the identified groups from the server system 598 via the network 495 (and optionally the mobile device 401).

Figure 7G:
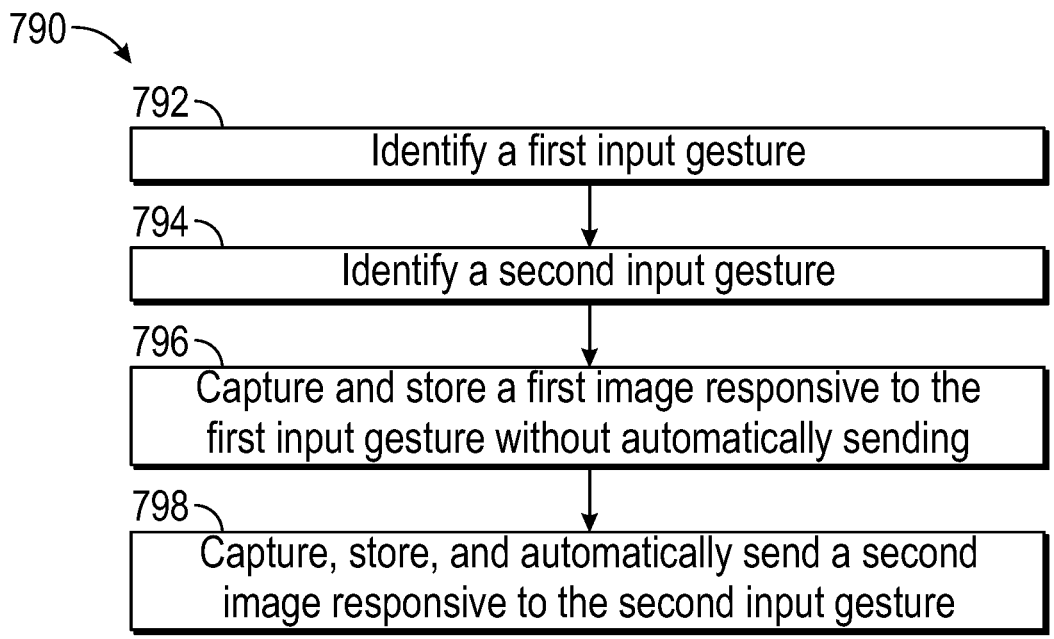

FIG. 7G depicts a flow chart 770 of example steps for automatically sending an image in response to a gesture. At block 792, the eyewear device 100 identifies a first input gesture. In an example, the processor 432 identifies a first input gesture (e.g., a single tap on user input device 491). At block 794, the eyewear device 100 identifies a second input gesture. In an example, the processor 432 identifies a second input gesture (e.g., a double tap or a tap and hold on user input device 491).

At block 796, the eyewear device 100 captures and stores a first image responsive to the first input gesture without automatically sending. In an example, the processor 432 captures an image with camera 114 and stores the image in memory 434 (e.g., after processor by image processor 412) in response to the first input gesture (e.g., the single tap on user input device 491).

At block 798, the eyewear device 100 captures, stores, and automatically sends a second image responsive to the second input gesture. In an example, the processor 432 captures an image with camera 114, stores the image in memory 434, and automatically sends the image (e.g., after processor by image processor 412) in response to the second input gesture (e.g., a double tap or a tap and hold on user input device 491).

The steps in FIGS. 7A-7G may be performed by one or more of processor 432 of eyewear device 100, processor 530 of mobile device 401, or a processor of the server system 499 upon loading and executing software code or instructions which are tangibly stored on a tangible computer readable medium (i.e., non-transitory), such as on a magnetic medium, e.g., a computer hard drive, an optical medium, e.g., an optical disc, solid-state memory, e.g., flash memory, or other storage media known in the art. Thus, any of the functionality performed by the processor 432 of eyewear device 100, processor 530 of mobile device 401, or a processor of the server system 499 described herein, such as the steps in FIGS. 7A-7G, may be implemented in software code or instructions that are tangibly stored on a tangible computer readable medium. Upon loading and executing such software code or instructions by the processors, the devices including the processors may perform any of the functionality of the devices described herein, including the steps in FIGS. 7A-7G described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
    image capture eyewear, including:
        a support structure;
        a camera connected to the support structure to capture images; and
        a user interface connected to the camera and the support structure, the user interface configured to trigger the camera to capture the images responsive to gestures on the user interface; and
    a processor coupled to the image capture eyewear, the processor configured to:
        identify one of a plurality of image capture gestures on the user interface, the plurality of image capture gestures including a capture gesture and a capture and auto send gesture;
        capture an image responsive to the one of the plurality of image capture gestures on the user interface;
        identify context selection criteria based on one or more user selections;
        identify a set of one or more designated recipients;
        receive the image;
        determine image data for the image captured responsive to the one of the plurality of image capture gestures where the one of the plurality of image capture gestures is the capture and auto send gesture;
        compare the determined image data to the identified context selection criteria to identify a match; and
        send the captured image to the set of designated recipients automatically when the identified one of the plurality of image capture gestures is the capture and auto send gesture; wherein the captured image is not automatically sent when the identified one of the plurality of image capture gestures is the capture gesture.

2. The system of claim 1, wherein the processor identifies the context selection criteria by identifying a first set of context selection criteria for the set of one or more designated recipients and a second set of context selection criteria and wherein the processor is further configured to:
    identify another set of one or more designated recipients for the second set of context selection criteria;
    compare the determined image data to the identified second set of context selection criteria to identify another match; and
    send the captured image to the other set of designated recipients automatically if the identified one of the plurality of image capture gestures is the capture and auto send gesture.

3. The system of claim 1, wherein the context selection criteria includes at least one of capture location, image content, or image quality and wherein to compare the determined image data the processor is configured to:
    compare the determined image data to the at least one of the capture location, the image content, or the image quality to identify the match.

4. The system of claim 1, wherein the context selection criteria includes at least two of capture location, image content, or image quality and wherein to compare the determined image data the processor is configured to:
    compare the determined image data to the at least two of the capture location, the image content, or the image quality to identify the match.

5. The system of claim 1, wherein to determine the image data the processor is configured to:
generate the image data; and
store the generated image data in meta data of the #mot-image.

6. The system of claim 5, further comprising:
a global positioning system (GPS) coupled to the processor, the GPS configured to generate location coordinates;
wherein the processor generates the image data responsive to a location coordinate received from the GPS when the image was captured.

7. The system of claim 6, wherein the processor is further configured to:
monitor the location coordinates received from the GPS;
determine a range of past location coordinates;
identify when the image capture eyewear is in a new area by determining a recent location coordinate is outside the determined range of the location coordinates; and
query a wearer of the image capture eyewear if they want to automatically send captured images while in the new area.

8. The system of claim 5, wherein to generate the image data the processor is configured to:
identify content within the image by applying a visual recognition algorithm to the image.

9. The system of claim 1, wherein to identify context selection criteria the processor is configured to:
receive remote image location information for remote images captured by other devices within a predefined range of the image capture eyewear;
group the remote image locations using to the remote image location information;
identify groups associated with the remote image location information for the remote images that exceed a predefined threshold; and
designate areas encompassing each of the identified groups as one of the context selection criteria.

10. A method for use with image capture eyewear including a camera configured to capture images and a user interface configured to trigger the camera to capture the images, the method comprising the steps of:
identifying, one of a plurality of image capture gestures on the user interface, the plurality of image capture gestures including a capture gesture and a capture and auto send gesture;
capturing an image responsive to the one of the plurality of image capture gestures on the user interface;
identifying context selection criteria based on one or more user selections;
identifying a set of one or more designated recipients;
receiving the image;
determining image data for the image captured responsive to the one of the plurality of image capture gestures where the one of the plurality of image capture gestures is the capture and auto send gesture;
comparing the determined image data to the identified context selection criteria to identifying a match; and
sending the captured image to the set of designated recipients automatically when the identified one of the plurality of image capture gestures is the capture and auto send feature; wherein the captured image is not automatically sent when the identified one of the plurality of image capture gestures is the capture gesture.

11. The method of claim 10, wherein the identifying the context selection criteria comprises identifying a first set of context selection criteria for the set of one or more designated recipients and a second set of context selection criteria and wherein the method further comprises:
identifying another set of one or more designated recipients for the second set of context selection criteria;
comparing the determined image data to the identified second set of context selection criteria to identify another match; and
sending the captured image to the other set of designated recipients automatically if the identified one of the plurality of image capture gestures is the capture and auto send gesture.

12. The method of claim 10, wherein the context selection criteria includes at least one of capture location, image content, or image quality and wherein the comparing the determined image data comprises:
comparing the determined image data to the at least one of the capture location, the image content, or the image quality to identify the match.

13. The method of claim 10, wherein the context selection criteria includes at least two of capture location, image content, or image quality and wherein the comparing the determined image data comprises:
comparing the determined image data to the at least two of the capture location, the image content, or the image quality to identify the match.

14. The method of claim 10, wherein the determining the image data comprise:
generating the image data responsive to location coordinates from a global positioning system when the captured image was captured; and
storing the generated image data in meta data of the image.

15. The method of claim 14, wherein the method further comprises:
monitoring the location coordinates received from a global positioning system (GPS);
determining a range of past location coordinates;
identifying when the image capture eyewear is in a new area by determining a recent location coordinate is outside the determined range of the location coordinates; and
querying a wearer of the image capture eyewear if they want to automatically send captured images while in the new area.

16. The method of claim 14, wherein the generating the image data comprises:
identifying content within the image by applying a visual recognition algorithm to the image.

17. The method of claim 10, wherein the identifying the context selection criteria comprises:
receiving remote image location information for remote images captured by other devices within a predefined range of the image capture eyewear;
grouping the remote image locations using to the remote image location information;
identifying groups associated with the remote image location information for the remote images that exceed a predefined threshold; and
designating areas encompassing each of the identified groups as one of the context selection criteria.

18. A non-transitory computer readable medium including instructions for use with image capture eyewear including a camera configured to capture images and a user interface configured to trigger the camera to capture the images, the instructions, when performed by a processor, configure the image capture eyewear to:

identify one of a plurality of image capture gestures on the user interface, the plurality of image capture gestures including a capture gesture and a capture and auto send gesture;
capture an image responsive to the one of the plurality of image capture gestures on the user interface;
identify context selection criteria based on one or more user selections;
identify a set of one or more designated recipients;
receive the image;
determine image data for the image captured responsive to the one of the plurality of image capture gestures where the one of the plurality of image capture gestures is the capture and auto send gesture;
compare the determined image data to the identified context selection criteria to identify a match; and
send the captured image to the set of designated recipients automatically when the identified one of the plurality of image capture gestures is the capture and auto send gesture; wherein the captured image is not automatically sent when the identified one of the plurality of image capture gestures is the capture gesture.

* * * * *